March 15, 1955
W. F. BUTLER
2,704,074
FASTENING OF AN END OF A FLEXIBLE
TUBE UPON AN END OF A RIGID TUBE
Filed May 24, 1954
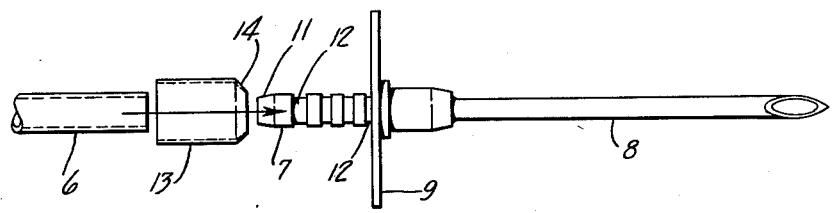
FIG_1_
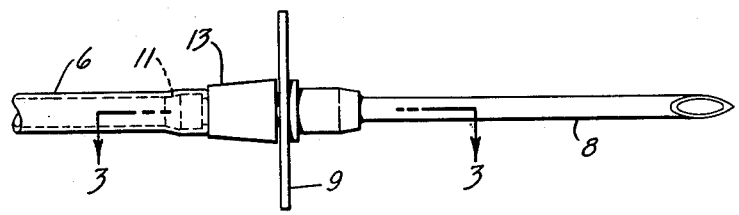
FIG_2_
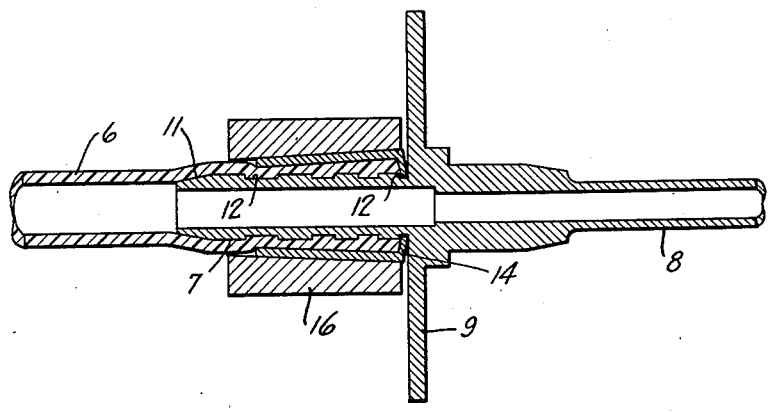
FIG_3_
INVENTOR.
William F. Butler
ECKHOFF & SLICK, Attys.
BY
A member of the firm

2,704,074

Patented Mar. 15, 1955

United States Patent Office

2,704,074

FASTENING OF AN END OF A FLEXIBLE TUBE UPON AN END OF A RIGID TUBE

William F. Butler, Oakland, Calif., assignor to Cutter Laboratories, Inc., a corporation of California Application May 24, 1954, Serial No. 431,879

2 Claims. (Cl. 128—221)

This invention relates to the fastening of an end of a flexible tube upon an end of a rigid tube.

In the manufacture of blood transfusion sets and the like, the problem is presented of fastening a flexible tube on the end of a needle or the like. Such fastening must be secure in that the two parts so joined cannot be parted without using extreme measures. Further, it is desirable that such securing be effected in a relatively simple and inexpensive manner inasmuch as blood transfusion sets, for example, are desired to be provided at relatively low cost.

It is in general the broad object of the present invention to provide a simple and improved connection between a flexible tube and the end of a metal tube.

A further object of the present invention is to provide a novel connection between a flexible tube and the hub of a needle in a blood transfusion set.

The invention includes other objects and features of advantage, some of which, together with the foregoing, will appear hereinafter wherein the present preferred form of tube connection is shown.

In the drawing accompanying and forming a part hereof, Figure 1 is a plan view showing the rigid tube, the needle and the connecting means utilized to join the needle and tube.

Figure 2 is a plan view of the assembled tube and needle.

Figure 3 is a section taken along the line 3—3 in Figure 2, showing the assembly operation.

Referring to the drawing, I have shown a flexible tube 6, which is intended to be attached securely to hub 7 of a needle, generally indicated at 8, the latter including a flange 9 thereon, which enables the needle and the attached tube 6 to be manipulated.

The hub 7 of the needle includes a tapered end 11 to permit the tube 6 to be readily moved into position along the hub, while the body of the hub includes a plurality of concentric serrations 12, one of which is closely adjacent flange 9 and intermediate the ends of the needle.

In accordance with this invention, means are provided for securing the flexible tube 6 securely in place on the hub 7 of the needle 8. In the form of the invention depicted in the drawing, this means includes a light metal ferrule 13 of a size to slip snugly over the end of tube 6, the ferrule having a tapered end 14.

In use, the ferrule is positioned on the end of the tube and the two are then pushed into position on the hub 7 of the needle. The end of the tube 6 and end 14 of the ferrule 13 are then immediately adjacent the last serration 12 in the hub 7 and the flange 9. With the tube and ferrule in this position, the assembled parts are placed in a conical cavity in a suitable die 16, the upper end of the cavity being slightly larger than the outside diameter of ferrule 13. A compressive force is then applied longitudinally of the needle 8, the ferrule thus being deformed into the shape of a frustrum of a cone, while the end 14 of the ferrule is turned inwardly to engage the hub within the last serration 12, as appears in Figure 3. As is there shown, the end 14 of the ferrule rests against the surface of the last serration 12 on the hub and so prevents longitudinal sliding motion of the flexible tube 6 along the hub 7.

From the foregoing, I believe it will be apparent that I have provide a relatively simple and novel means for connecting a metal tube such as provided by the hub of a needle and a flexible tube such as is included in a blood transfusion set.

I claim:

1. A hypodermic needle having one end sharpened to a point and having a serrated hub at its other end, a flexible tube fitted over said hub and covering the serrations, and a metal ferrule positioned about said hub and compressed on said hub about said tube to force the tube into tight engagement with the serrated hub, said ferrule being compressed into frusto-conical form with the base thereof intermediate the ends of the needle and adjacent the sharpened end to provide a conical finger grip portion for ready and accurate manipulation of the sharpened needle end.

2. A hypodermic needle having one end sharpened to a point and having a serrated hub at its other end, a flexible tube fitted over said hub and covering the serrations, and a metal ferrule positioned about said hub and compressed about an intermediate portion of said hub and about said tube to force the tube into tight engagement with only a portion of the serrated hub, said ferrule being compressed into frusto-conical form with the base thereof intermediate the ends of the needle and adjacent the sharpened end to provide a conical finger grip portion for ready and accurate manipulation of the sharpened needle end.

References Cited in the file of this patent

UNITED STATES PATENTS

| | | |
|---|---|---|
| 2,216,839 | Hoffman | Oct. 8, 1940 |
| 2,314,002 | Lusher et al. | Mar. 16, 1943 |
| 2,430,921 | Edelmann | Nov. 18, 1947 |
| 2,689,564 | Adams et al. | Sept. 21, 1954 |